Patented Apr. 30, 1940

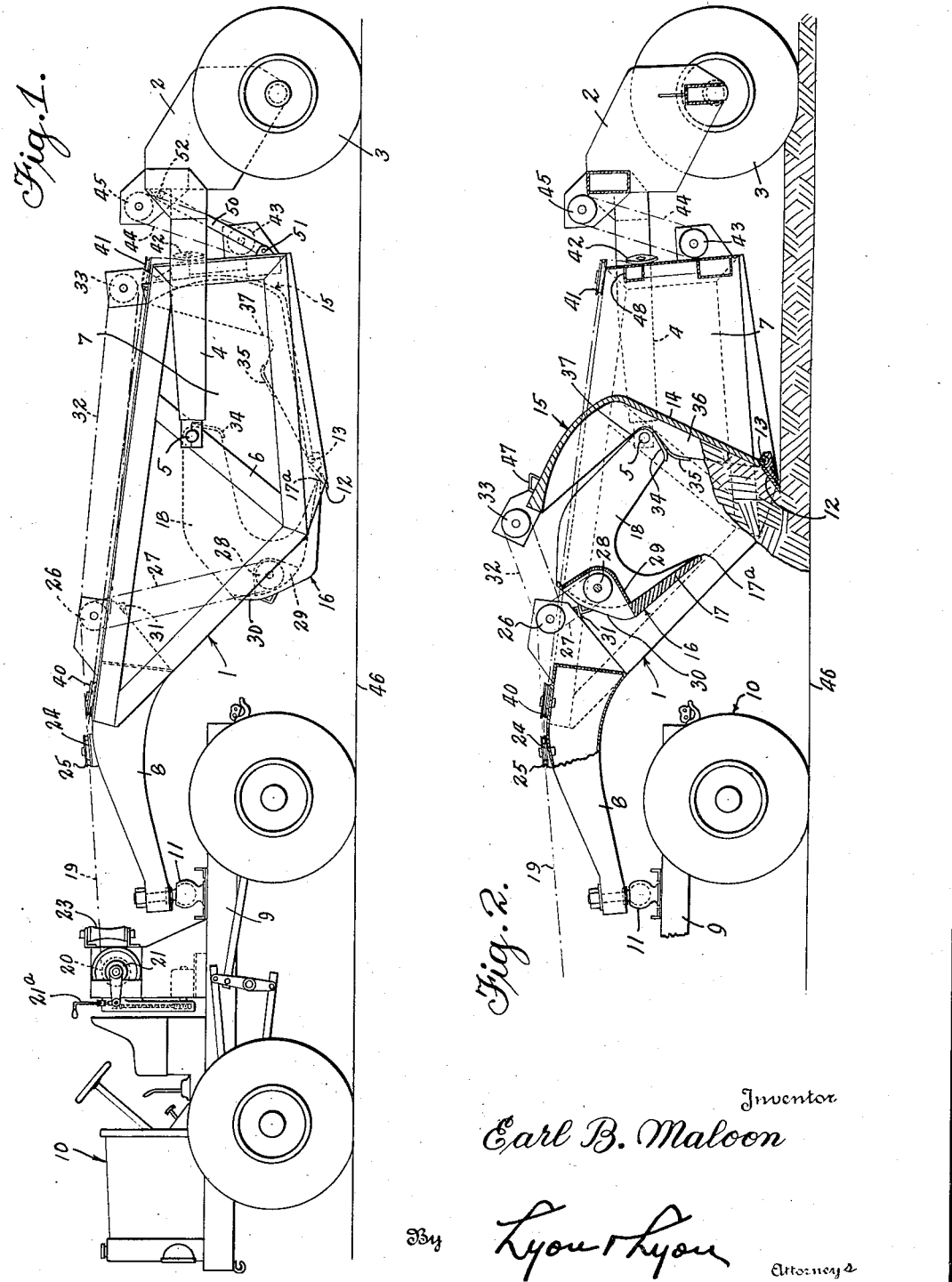

2,198,916

UNITED STATES PATENT OFFICE 2,198,916

CARRY TYPE SCRAPER

Earl B. Maloon, Alhambra, Calif., assignor to Southwest Welding & Manufacturing Co., Inc., Alhambra, Calif., a corporation of California Application March 29, 1938, Serial No. 198,707

6 Claims. (Cl. 37—129)

This invention relates to apparatus involving the use of a type of road scraper and grader known as a carry type scraper. In a common type of this scraper the scraper frame has forward wheels and rear wheels, and at an intermediate point between the forward wheels and rear wheels the scraper frame is provided with a scraper blade that extends transversely to the direction of travel of the scraper. A bucket is hingedly connected to the rear edge of the scraper blade, and when the blade is in its digging position the earth constituting the load, passes over the blade into the bucket. Cooperating with the bucket an apron is usually provided, which is pivotally mounted at a considerable distance above the bucket, and in its closed position the lower edge of this apron lies adjacent the scraper blade, in which position the apron cooperates with the bucket to support and carry the load. Scrapers of this type are usually attached to the draw bar of a tractor, and if the picked-up load is required to be moved to any distance, considerable time is consumed by the tractor in moving the load to a point where it is to be dumped.

One of the objects of this invention is to provide a carry type scraper of this general type, having a construction enabling it to be supported at its forward end on an automobile, the general purpose being to improve the dirigibility and speed of movement of the loaded scraper.

In the preferred embodiment of the invention the forward end of the scraper frame is attached to an automobile frame forward of the scraper, and flexible connections are employed from the automobile back to the scraper for controlling its mechanism, in the present instance, for controlling the movements of the bucket, apron, and blade, to enable the load to be gathered in the bucket raised to an elevation for moving the load, while confined by the cooperation of the apron with the bucket.

A further object of the invention is to provide improved means for supporting and guiding the flexible connections between the automobile and the scraper; also to insure that the operating connections between the automobile and the scraper will be maintained when the automobile is turning toward one side or the other.

In this type of scraper, it is found necessary in dumping the load, to raise the bucket so that the plane of its bottom makes a very high angle with the horizontal line or plane, and this brings the center of gravity of the dumping bucket pretty nearly in line with the pivot point or hinge point of the lower edge of the bucket on the scraper blade; hence the action of gravity is not of much assistance in returning the bucket to its "closed" or operating position. Hence in this type of scraper, and particularly one in which the bucket and the apron are operated by cables, it is necessary to provide means for effecting the return of the bucket brought into action merely by slacking up on the cable, or cables, controlling the same. One of the objects of this invention is to overcome this difficulty, and to provide simple means whereby the return of the apron by gravity will automatically initiate the return of the bucket; in other words, to provide means for moving the bucket off of its "dead center position" as it were, which the bucket has when dumping, and thereby enabling the action of gravity on the bucket to complete its return movement.

Further objects of the invention will appear hereinafter.

The invention consists in the novel parts and combination of parts to be described hereinafter, all of which contribute to produce an efficient carry type scraper.

A preferred embodiment of the invention is described in the following specification, while the broad scope of the invention is pointed out in the appended claims.

In the drawings:

Fig. 1 is a side elevation of a carry type scraper and an automobile supporting the forward end of the same. This view shows the scraper with its body in an elevated position for carrying a load.

Fig. 2 is a vertical section through the scraper illustrated in Fig. 1, the forward portion of the automobile being broken away. This view illustrates the scraper in dumping position, and particularly illustrates the means for enabling the return movement of the apron by gravity to initiate the return movement of the bucket from its dumping position.

Figure 3:
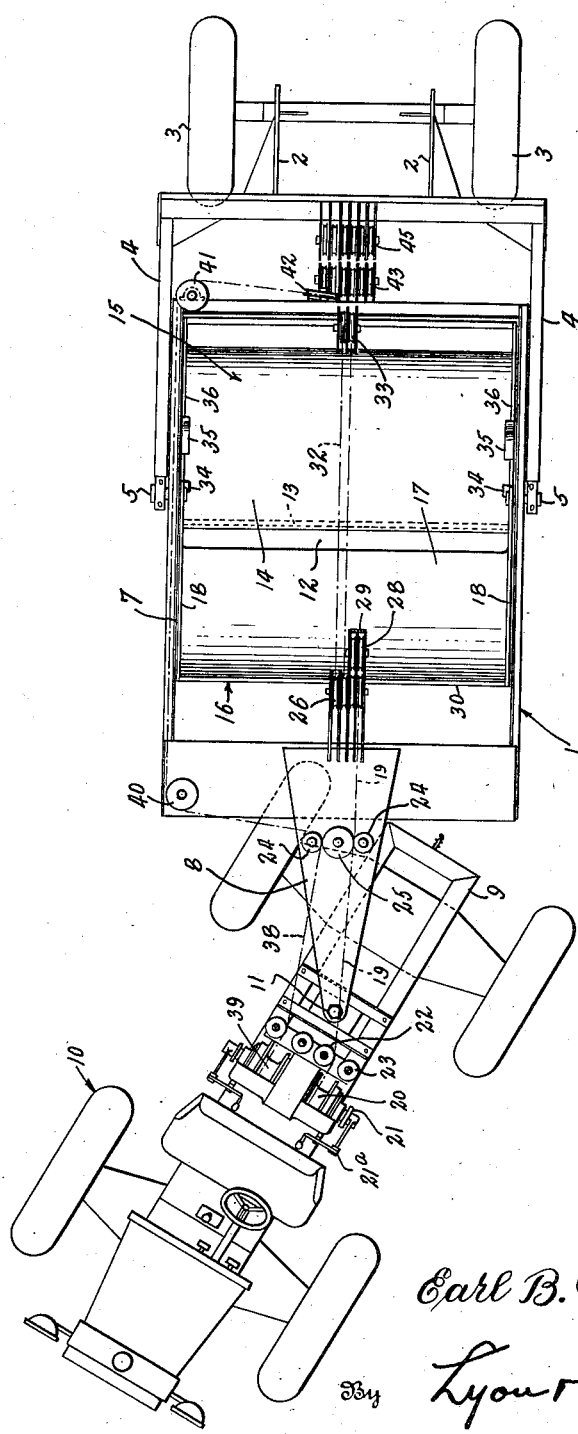

Fig. 3 is a plan of the complete apparatus illustrated in Fig. 1, and representing the automobile and scraper with their longitudinal axes disposed at an angle to each other. This view particularly illustrates the manner in which the flexible connections between the automobile and the scraper will be maintained in any displaced angular position of the automobile, of course, within reasonable limits.

Before proceeding to a more detailed description of the invention, it should be stated that carry type scrapers of this type, usually have forward wheels and rear wheels between which the frame of the scraper is supported. The forward end of the scraper is usually attached to the draw bar of a tractor, and the mechanism of the scraper is controlled from the driver of the tractor. Tractors are quite dirigible due to the fact that the flexible belts or caterpillars at the sides of the tractor can be driven in opposite directions. However, in some grading operations it is necessary to move the load to a considerable distance. A tractor is ill adapted for performing this function, as it travels along a roadway with a very slow speed. In accordance with my invention, I provide a construction which eliminates the forward axle of the scraper, and I support the forward end of the scraper frame on an automobile or small truck. One advantage of this is that at least four wheels on the truck are brought into action to support half of the weight of the scraper and its load. Any number of wheels may be provided at the rear end of the scraper for supporting the scraper and its load at the rear end. By reason of the fact that this construction provides for the use of a considerable number of wheels, it is possible for the automobile and loaded scraper to travel over relatively loose earth without sinking in unduly.

Furthermore, in addition to the fact that my invention eliminates the cost of the forward axle and wheels of the scraper, it also enables the load when necessary, to be transported to a considerable distance along a highway at a relatively high speed compared with the rate of speed that is possible in transporting such a load with a tractor. Furthermore, the use of an automobile instead of a tractor, is very advantageous because the automobile runs on pneumatic tires, or rubber tires of some kind, and does not subject the roadway to the destructive hammering action of tractor's flexible tracks, or that of caterpillar shoes.

While the operation of the scraper in picking up a load and controlling operation of its bucket and scoop may be controlled from the automobile by any suitable means, in the present instance, I have illustrated the use of flexible cables for this purpose, and in the type of scraper illustrated, paying out one of these cables will let the frame of the scraper drop down at an intermediate point so as to bring the scraper blade into action on the earth that is to be picked up. After the load has been picked up and has been transported to the place at which the load is to be dumped, the taking up of the other cable will raise the bucket and apron to an elevated position, and while in this position the automobile can be advanced to dump the load and grade the dumped earth to the level of the scraper.

In this type of scraper the bucket has no side plates for retaining the load, but the load is retained by the side plates of the scraper frame. In using the scraper, earth may pack in the space between the sides of the bucket and the side plates of the scraper frame, and this interferes somewhat with the return of the bucket by gravity to its depressed or "closed" position. Furthermore, it is found that in practice, in order to effectively dump the load, it is necessary to raise the bucket so that the plane of its bottom approaches closely to a vertical position, and this, of course, tends to bring the center of gravity of the bucket nearly in line with the forward edge of the bucket that is hinged to the scraper blade. On this account the bucket does not return freely by gravity to its normal position after dumping. In accordance with my invention, I utilize the weight of the raised apron to initiate the return movement of the bucket by gravity from its dumping position.

Under certain conditions, it is sometimes necessary to be able to control the operations of the scraper from the automobile while the automobile is disposed at a considerable angle to the scraper; in other words, moving toward one side or the other. In accordance with my invention, I provide means for maintaining the flexible connections, for example, operating cables intact, although the longitudinal axis of the automobile may form a considerable angle with the longitudinal axis or fore and aft line of the scraper.

Referring more particularly to the parts, and especially to Figs. 1 and 2, the scraper 1 is supported at its rear end on a rear axle housing 2 carrying wheels 3, which may be of any number desired. From the rear axle housing, a pair of rigid arms 4 extend forwardly, and these arms are connected by large pivot pins 5 at each side to the frame 1. These pivots are preferably attached at stout diagonal frame bars 6 respectively, which are attached on the outer side of the side plates 7 of the scraper. The forward end of the frame 1 is formed with a long neck or tongue 8 that extends over the frame 9 of the automobile 10 that is to be used with the scraper, and the forward end of this neck is connected to the frame 9 and supported by the frame through the agency of a pivot joint 11, which preferably is constructed as a universal joint. In the present instance, this universal joint may be of a ball and socket type, but any type of universal joint may be employed. Between the side plates 7 of the scraper body 1 a scraper blade 12 extends, and in the present instance this blade is held fixed on the frame, but at its rear edge a pivotal connection or hinge connection 13 is formed for the forward edge of the bottom 14 of the bucket 15.

Cooperating with the bucket 15 an apron 16 is provided, which preferably comprises a bottom plate 17 and side arms or plates 18, which are pivoted at an elevated point. In the present instance, they are illustrated as supported on the pivot pins 5. The bucket and apron are controlled by the driver of the automobile through a single cable 19 (see Fig. 3), which cable is wound at its forward end on a drum 20 (see Fig. 3), the rotation of which is controlled by a clutch 21 through the agency of a lever 21a. In passing from the drum 20, this cable passes between two vertical elongated guide pulleys or rollers 22 and 23, adjacent to the joint 11, and from this point it passes rearwardly and through suitable guide means associated with the neck 8. In the present instance, this guide means includes one of two side pulleys 24, between which a large pulley or sheave 25 is located to keep this cable and the other cable to be described hereinafter, intact during operations of the scraper. From its pulley 24 this cable extends rearwardly over relatively fixed pulleys 26 below which a fall 27 is provided leading down to pulley 28 carried in a narrow housing or pocket 29 formed on the back plate 30 of the apron 16. When the cable 19 is taken up by the drum, the first thing that happens is that the cable in the fall 27 shortens, thereby pulling the apron 17 up against a stop 31 (see Fig. 2). After this occurs a loop 32, or loops, of the same cable 19, which are connected to sheaves 33 at the rear edge of the bucket 15, will commence to shorten and will pull the bucket up to the dumping position illustrated in Fig. 2. From the examination of Fig. 2, it will be evident that when the bucket 15 is in this position its center of gravity is nearly in line with the hinge or pivot connection 13. This will make it difficult for the bucket 15 to return by gravity to its normal or filling position. In accordance with my invention, I provide means for initiating the return movement of the bucket 15 by gravity, and in order to accomplish this, I prefer to employ cooperating cams. As illustrated in Fig. 2, I provide two cams 34 on the rearward ends of the side arms 18 of the apron, which may be in the form of flanges turned inwardly from the plane of the side arms 18. Similar flanges 35 may be formed by bending the side webs 36 of the bucket inwardly. These side webs 36 are intended to stiffen the bucket, and the edge of each of these webs 36 forms a re-entrant angle 37 into which the rear ends of the side arms 18 of the apron project when these parts are in their raised or dumping position.

With this arrangement it will be evident that as soon as the cable 19 is slackened, the weight of the apron 16 will cause the apron to swing down. As this occurs, the cam 34 will cooperate with the cam 35 to push or "kick" the bucket 15 towards the right as viewed in Fig. 2, thereby getting it off "dead center"; and as soon as the downward movement of the bucket is started, a sufficient lever arm for the center of gravity of the bucket will develop to insure that the bucket will swing down to its normal depressed position.

The other cable 38 extends back from its corresponding drum 39, which is similar to the drum 20 and controlled in a similar manner. This cable 38 is guided similarly to the cable 19, but after it passes its guide pulley 24, it is guided off to the side of the scraper (see Fig. 3) passing around corner pulleys 40 and 41, and thence at the rear passing inwardly to a point near the central longitudinal axis of the scraper where it passes around a special guide sheave 42 and thence downwardly to a gang of sheaves 43 about which it passes so as to form a suspension loop or fall 44, the upper end of which is supported on sheaves 45 carried at an elevated point on the axle housing 2. With this arrangement for the cable 38, it will be evident that by pulling up on this cable the scraper will fulcrum at the universal connection 11 and the rear end of the body 1 of the scraper will be raised. This, of course, will raise the pivot point 5, and also will change the elevation of the scraper blade 12. By paying out on this cable the scraper blade may be dropped sufficiently to enable it to scrape the earth and fill the scraper, operating at a level below the ground line 46. In the operation of these scrapers, it should be understood that in filling the scraper bucket, the bucket is held in its depressed position, at which time a stop bracket 47 (see Fig. 2) on the back of the bucket, will rest upon the upper face of a cross bar or upper sill 48. At this time the cable 19 is partially paid out so that the bottom 17 of the apron will be held in a slightly raised position. In this way a gap or throat is formed between its edge 17a, and the forward edge of the blade 12, and through this throat the dirt passes and piles up in the bucket. This load will be supported at its forward end on the apron, and when the bucket is sufficiently full the apron 16 is let down to its closed position to retain the load. At this time the edge 17a of the apron will rest upon the upper forward and inclined face of the scraper blade 12.

Referring again to Fig. 3, it will be noted that by reason of the location of the drums near the longitudinal axis of the automobile, although the longitudinal axis of the automobile forms a considerable angle with the longitudinal axis of the scraper, the pulleys for the cables will maintain them in the proper operating condition so that the bucket and apron of the scraper can be controlled in spite of the fact that the axis of the automobile is not in longitudinal alignment with the longitudinal axis of the scraper.

It will be evident that after filling the scraper, the scraper and its load can be transported by the automobile at a considerable speed as compared with its possible speed of movement by a tractor.

If the load on the scraper tends to produce vibration of the scraper in a vertical plane where it is supported on the cable falls 44, I may provide a pair of struts 50 (see Fig. 1) the ends of which may be secured respectively, to the rear portion of the scraper frame 1 at the point 51, and to the upper portion of the rear axle housing 2 at the point 52. Detachable pins may be used for connecting the ends of these links 50.

It is understood that the embodiment of the invention described herein is only one of the many embodiments this invention may take, and I do not wish to be limited in the practice of the invention, nor in the claims, to the particular embodiment set forth.

What I claim is:

1. In apparatus of the kind described, the combination of an automobile frame with forward and rear wheels supporting the same, a carry type scraper having rear wheels only and having a frame connected with the automobile frame to support the forward end of the scraper on the same, said scraper having a pivotally supported bucket and a pivotally supported apron cooperating with the bucket to pick up and support a load, flexible means leading back from the automobile to the scraper, means connected with the flexible means on the scraper for connecting the same with the apron and with the bucket, and affording means for raising the bucket and the apron to a dumping position, said apron being constructed and disposed so that it will return by gravity from its dumping position toward its closed position, and means actuated by the gravity return of the apron for initiating the return movement of the bucket from its dumping position.

2. In apparatus of the kind described, the combination of an automobile frame with forward and rear wheels supporting the same, a carry type scraper having rear wheels only and having a frame connected with the automobile frame to support the forward end of the scraper on the same, said scraper having a pivotally supported bucket and a pivotally supported apron cooperating with the bucket to pick up and support a load, cables leading back from the automobile to the scraper, means connecting the cables with the apron and with the bucket for raising the same to their dumping positions, said apron being constructed and disposed so that it will return by gravity from its dumping position toward its closed position, and cam means between the apron and the bucket enabling the gravity return of the apron to initiate the return movement of the bucket from its dumping position.

3. In a carry type scraper, the combination of a frame, a transverse relatively fixed scraper blade carried by the frame, a bucket pivotally attached adjacent the rear edge of the said blade, an apron pivotally supported on the frame and cooperating with the bucket to support and carry the load, means for raising the bucket and the apron from their working positions to their dumping position, said apron constructed so that in its dumping position its center of gravity is substantially out of line with its pivotal connection so that the weight of the apron exerts a force to move the apron toward its depressed position, and cam means between the bucket and the apron enabling the descent of the apron by gravity to exert a force on the bucket to initiate its return by gravity to its working position.

4. In apparatus of the kind described, the combination of an automobile frame with forward and rear wheels supporting the same, a carry type scraper devoid of forward wheels and having rear wheels, said scraper having a frame with a neck at its forward end projecting over the automobile frame, a pivot joint supporting the said neck and the weight of the forward end of the scraper on the automobile frame forward of its rear wheels, said scraper having a pivotally supported bucket and a pivotally supported apron cooperating with the bucket to support the load, flexible means leading back from the automobile to the scraper, means connected with the flexible means on the scraper for connecting with the apron and with the bucket for operating the same and affording means for raising the bucket and apron to a dumping position, said apron being constructed and disposed so that it will return by gravity from its dumping position toward its closed position, and means actuated by the gravity return of the apron for initiating the return movement of the bucket from its dumping position.

5. In a carry type scraper, the combination of a pivotally supported bucket, and a pivotally supported apron cooperating with the bucket to pick up and support a load, flexible means connected with the bucket and with the apron for raising the bucket and the apron to a dumping position, said apron being constructed and disposed so that it will return by gravity from its dumping position to its closed position, and means actuated by the gravity return of the apron for initiating the return movement of the bucket by gravity from its dumping position.

6. In a carry type scraper, the combination of a frame, a bucket supported for positive pivotal rotation about an axis fixed on the frame, an apron supported for positive pivotal rotation about an axis fixed on the frame, said bucket and apron cooperating with each other to pick up and support a load, flexible means connected with the bucket and with the apron for raising the bucket and the apron to a dumping position, said apron being constructed and disposed so that it will return by gravity from its dumping position to its closed position, and means actuated by the gravity return of the apron for initiating the return movement of the bucket by gravity from its dumping position.

EARL B. MALOON.